United States Patent [19]

Wilkinson et al.

[11] Patent Number: 5,452,293

[45] Date of Patent: Sep. 19, 1995

[54] APPARATUS AND METHOD OF TRANSMITTING CALL INFORMATION PRIOR TO ESTABLISHING A CONNECTION PATH

[75] Inventors: I. C. Keith Wilkinson, Newark; P. Kingston Duffie, Palo Alto; Lawrence G. Roberts, Woodside, all of Calif.

[73] Assignee: DSC Communications Corporation, Plano, Tex.

[21] Appl. No.: 188,559

[22] Filed: Jan. 27, 1994

[51] Int. Cl.$^6$ .............................................. H04L 12/26
[52] U.S. Cl. .......................................... 370/54; 370/60; 370/68.1; 370/79
[58] Field of Search ................... 370/14, 54, 60, 60.1, 370/68.1, 79, 94.1, 94.2

[56] References Cited

U.S. PATENT DOCUMENTS

| | | | |
|---|---|---|---|
| 4,484,326 | 11/1984 | Turner | 370/60 |
| 4,488,288 | 12/1984 | Turner | 370/60 |
| 4,488,289 | 12/1984 | Turner | 370/60 |
| 4,550,397 | 10/1985 | Turner et al. | 370/60 |
| 4,829,227 | 5/1989 | Turner | 370/60 |
| 4,849,968 | 7/1989 | Turner | 370/94 |
| 4,862,451 | 8/1989 | Closs et al. | 370/60 |
| 4,922,244 | 5/1990 | Hullett et al. | 340/825.5 |
| 4,947,388 | 8/1990 | Kuwahara et al. | 370/60 |
| 4,955,020 | 9/1990 | Stone et al. | 370/85.9 |
| 4,956,839 | 9/1990 | Torii et al. | 370/60 |
| 5,001,704 | 3/1991 | Narup et al. | 370/85.13 |
| 5,029,124 | 7/1991 | Leahy et al. | 364/900 |
| 5,029,164 | 7/1991 | Goldstein et al. | 370/95.1 |
| 5,050,166 | 9/1991 | Cantoni et al. | 370/94.1 |
| 5,062,106 | 10/1991 | Yamazaki et al. | 370/94.1 |
| 5,130,975 | 7/1992 | Akata | 370/60 |
| 5,130,984 | 7/1992 | Cisneros | 370/94.1 |
| 5,132,966 | 7/1992 | Hayano et al. | 370/79 |
| 5,144,619 | 9/1992 | Munter | 370/60.1 |
| 5,150,358 | 9/1992 | Punj et al. | 370/84 |
| 5,367,517 | 11/1994 | Cidon et al. | 370/60 X |

OTHER PUBLICATIONS

Steven E. Minzer, "Broadband ISDN and Asynchronous Transfer Mode (ATM)", *IEEE Communications Magazine*, pp. 17–57, Sep. 1989.

A. Lyman Chapin, "Connections and Connectionless Data Transmission", *Proceedings of the IEEE*, pp. 1365–1371, vol. 71, No. 12, Dec. 1983.

Abdi R. Modarressi and Ronald A. Skoog, "Signaling System No. 7: A Tutorial", *IEEE Communication Magazine*, pp. 19–35, Jul. 1990.

L. G. Roberts, "The Evolution of Packet Switching", *Proceedings of the IEEE*, pp. 1307–1313, vol. 66, No. 11, Nov. 1978.

"Draft Recommendation I.211—ISDN Service Aspects", COM XVIII-R 34-E, pp. 32–48, CCITT-/COMXVII/RAPP/RO34E2.TXS.

*Primary Examiner*—Melvin Marcelo
*Attorney, Agent, or Firm*—Baker & Botts

[57] ABSTRACT

Call information is transmitted between broadband switching modules (12) and a broadband services switch (10). Each broadband switching module (12) receives call information from outside the broadband services switch (10) and translates the information into asynchronous transfer mode (ATM) cells. Each broadband switching module (12) also generates a route setup cell and a route teardown cell in order to establish and release a connection path to another broadband switching module (12), respectively. The broadband switching module (12) sends the route setup cell, that includes a virtual circuit identifier identifying the connection path for the calling information ATM cells, along a dedicated VCI to an intermediary broadband switching module (12). The sending broadband switching module (12) then transmits the payload ATM cells containing the calling information immediately after transmitting the route setup cell and before receiving an indication that a connection path has been established. The payload ATM cells are transmitted along a payload VCI determined by the broadband switching module (12) which was placed within the route setup cell.

17 Claims, 2 Drawing Sheets

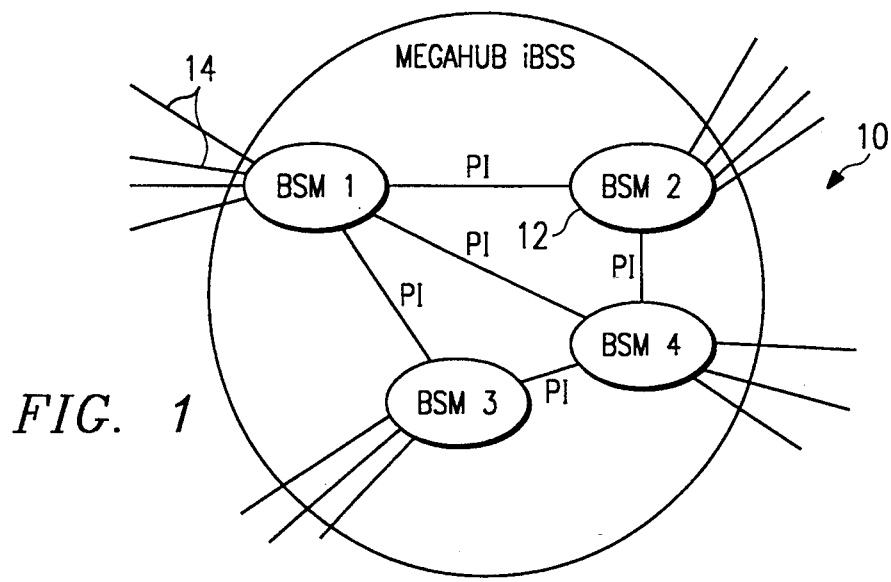
FIG. 1
FIG. 2
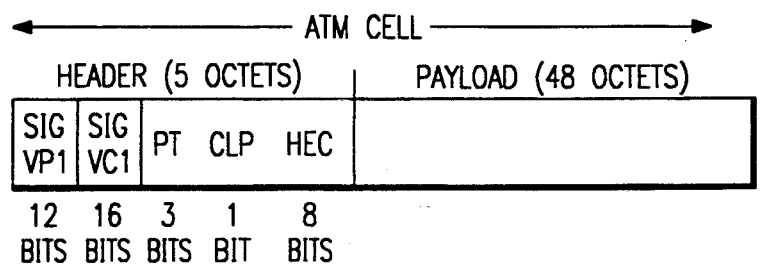
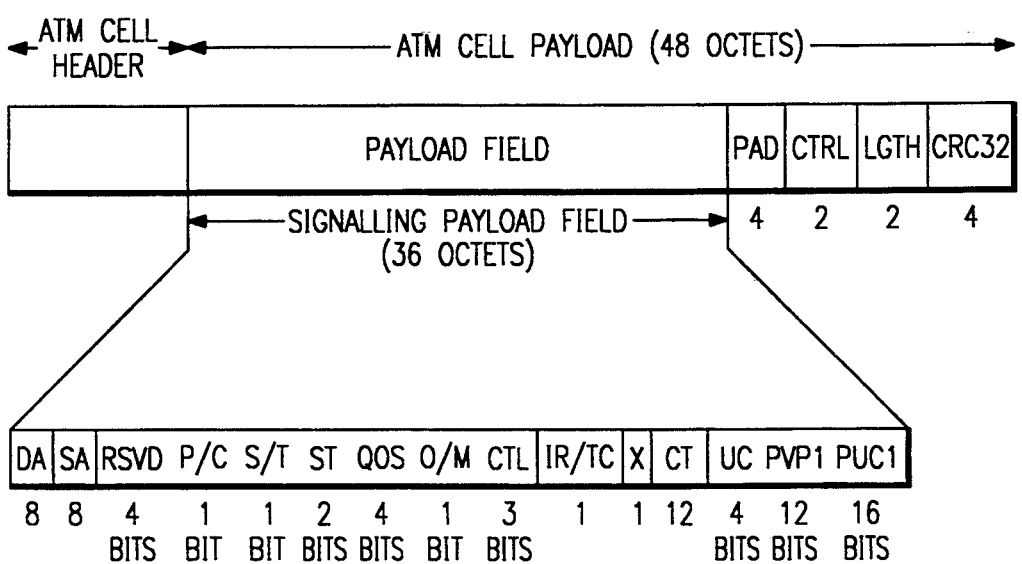
FIG. 3

APPARATUS AND METHOD OF TRANSMITTING CALL INFORMATION PRIOR TO ESTABLISHING A CONNECTION PATH

TECHNICAL FIELD OF THE INVENTION

The present invention relates in general to telecommunication switching systems and more particularly to an apparatus and method of transmitting call information prior to establishing a connection path.

BACKGROUND OF THE INVENTION

In a conventional telecommunications switching network, a communication path must be established before distribution of call information messages, such as fax, EMAIL, or voice, can be distributed along the established path. A propagation delay occurs across the network when setting up and releasing a connection path. For example, the propagation delay across a 2,500 mile long network may be approximately 20 milliseconds, depending on protocol speeds. In order to set up and release a connection path, a connection request is sent across the network, a connection acknowledgment is returned, a disconnect request is sent with the call information, and a disconnect acknowledgment is returned. The total time for transmitter operation would be 80 milliseconds plus the time required to send the message over the network. For short message types, it takes longer to establish the connection path than the time it takes to actually send the message type.

The highest volume of messages in packet networks has been electronic mail with an average message size of approximately 2,000 bytes. Messages of this small size take about 0.5 seconds to be fully delivered, far longer than the delay of 20 to 60 milliseconds caused by one to three transit times at the speed of light over a 2,500 mile network. Facsimile transmission however has become by far the primary form of message distribution. Fax messages average 100 kilobytes, equivalent to about a first class U.S. mail letter of three pages. As technology advances, image and fax document movement will increase in traffic flow and gradually replace much of the paper flow carried today by the U.S. mail. Therefore, it is desirable to distribute these relatively short, high priority messages in a quicker and efficient fashion.

From the foregoing it may be appreciated that a need has arisen to transmit call information without the propagation delay of establishing and releasing a connection path. A need has also arisen for sending call information without first establishing a connection path between a source and a destination.

SUMMARY OF THE INVENTION

In accordance with the present invention, an apparatus and method of transmitting call information prior to establishing a connection path are provided which substantially eliminate or reduce disadvantages and problems associated with conventional telecommunication switching systems.

According to an embodiment of the present invention, there is provided a method of transmitting call information prior to establishing a connection path that includes creating a route setup cell for specific call information corresponding to traffic within a single call. The route setup cell is transmitted to an intermediary destination in order to establish a connection path for the specific call information. The specific call information is immediately transferred to the intermediary destination after the transmission of the route setup cell along the desired connection path and prior to receiving any indication from the intermediary destination that the connection path has been established.

The apparatus and method of the present invention provide various technical advantages over conventional telecommunication switching systems. For example, one technical advantage is in creating a route setup cell and a route teardown cell for establishing and releasing a connection path between telecommunication switches. Another technical advantage is in transmitting specific call information prior to establishment of the connection path. Yet another technical advantage is in avoiding the delay of establishing a connection path prior to transmission of call information as performed in conventional telecommunication switching systems. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a broadband services switching system within a telecommunication switching network;

FIG. 2 illustrates an example of an asynchronous transfer mode (ATM) cell;

FIG. 3 illustrates an example of contents of route setup and teardown cells;

DETAILED DESCRIPTION OF THE INVENTION

Figure 4:
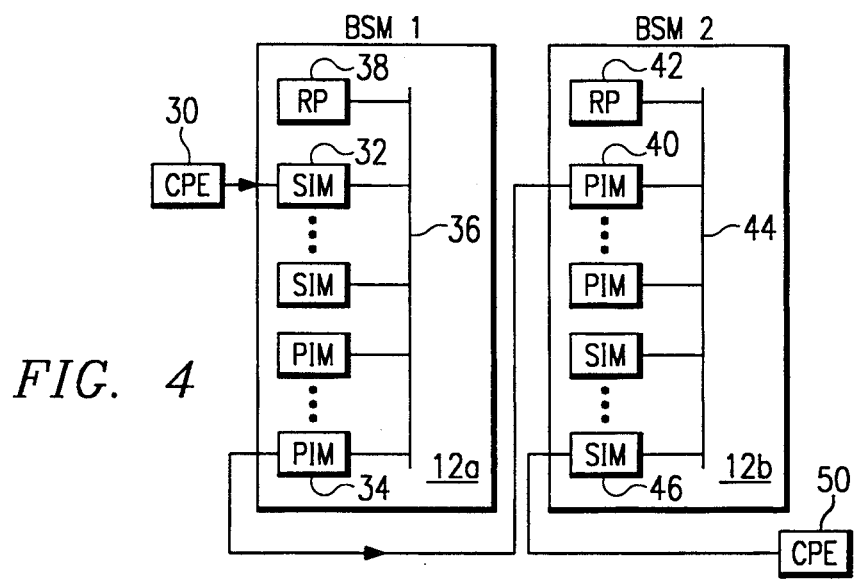
FIG. 4 illustrates a block diagram of an example of a self threading ATM cell.

FIG. 1 shows a broadband services switching system 10 within a telecommunications switching network. The telecommunication switching network includes a broadband services switching system 10 which is made up of a plurality of broadband switching modules 12. Broadband switching modules 12 are capable of processing traffic received in a variety of traffic configurations, including frame relay or SWITCHED MULTI-MEGABIT DATA SERVICE (SMDS), over ingress/egress lines 14. The operation of the telecommunications network shall be discussed with reference to the SMDS service, though other specific traffic configuration services may also be employed. Broadband switching modules 12 are interconnected to each other by proprietary interfaces PI within broadband services switching system 10. Each broadband switching module need not necessarily be connected to all other broadband switching modules by proprietary interfaces PI within broadband services switching system 10. Each broadband switching module within broadband services switching system 10 acts as an independent switching entity.

Within broadband services switch 10, all traffic is routed and switched using asynchronous transfer mode (ATM) cells. All incoming traffic received by broadband services switching system 10 on the ingress portion of ingress/egress line 14 is adapted by the ingress broadband switching module from a specific traffic configuration into an internal ATM based format. All outgoing traffic leaving broadband services switching system 10 on the egress portion of ingress/egress lines 14 is retranslated from the ATM based format into an appropriate traffic configuration service. Every call received in a broadband switching module 12 is converted into a series of ATM cells.

ATM cells are fixed length 53 byte, or octet, data blocks consisting of a five octet header followed by a 48 octet payload. FIG. 2 shows an example of an ATM cell structure with typical header fields. The five octet header has a virtual path identifier, virtual circuit identifier (VPI/VCI) field that is used to logically connect a series of cells as belonging to the same call. A payload type (PT) field is typically set to zero. A cell loss priority (CLP) field is used to mark cells eligible for discard during periods of network congestion. A header error check sequence (HEC) field is used to validate the header. The most important field in the five octet header is the VPI/VCI field. Each call received at a broadband switching module 12 is assigned a unique VPI/VCI for routing and switching performed by the broadband switching module 12. Each ATM cell generated for the call by broadband switching module 12 will contain this unique VPI/VCI. Since each broadband switching module 12 is an independent switching entity, each broadband switching module 12 will assign its own unique VPI/VCI for the ATM cells corresponding to the same call. Certain VCIs are reserved for special signalling purposes. One of the special VCIs is used for self-threading ATM route setup cell and route teardown cell transmission.

Traffic carried between broadband switching modules 12 on proprietary interfaces PI comprises self-threading ATM calls. Each call received into broadband services switching system 10 at a broadband switching module 12 is adapted into a series of ATM cells as discussed above. The series of ATM cells for a specific call includes a route setup cell containing all the information required to define a routing for the call, one or more payload ATM cells containing the call information, and a route teardown cell to indicate that a call has been completed and that the resources allocated to that call can be reused.

FIG. 3 shows the structure of a route setup cell and a route teardown cell. The route setup cell and the route teardown cell are configured into the ATM cell format used within broadband services switching system 10. Table I describes the contents of each field within a route setup cell or route teardown cell.

TABLE I

| | Payload Signalling Packet Format |
|---|---|
| DA | Destination Address |
| | For a setup packet, this is the address to which the connection is to be made. Addressing uses E.164 numbering over 16 BCD-encoded digits (compatible with definitions in TR-TSV-000772 and TR-TSV-001060). Multicast connections may be supported through the use of group addresses. This field is reserved for teardown signalling. |
| SA | Source Address |
| | For a setup packet, this is the address from which the connection is requested. Same addressing scheme as is used for the destination address. This field is reserved for teardown signalling. |
| Rsvd | Reserved |
| | Fields marked reserved are available for future use and should be filled with zeroes. |

TABLE I-continued

| | Payload Signalling Packet Format |
|---|---|
| P/C | Path or Circuit |
| | If set to 1, this indicates field that signalling refers to a virtual path that is to be established or removed (depending on the S/T field). If set to 0, this field indicates that signalling refers to a virtual circuit that is to be established or removed. |
| S/T | Setup or Teardown |
| | If set to 1, this field indicates that the path or circuit (depending on the P/C field) is to be established. If set to 0, this field indicates that the path or circuit is to be removed. Note that for the set up of a virtual path, the Payload VCI field is ignored. For the set up of a virtual circuit, the Payload VPI defines the virtual path on which the connection is to be established. |
| Rsvd | Reserved |
| QOS | Quality of Service |
| | On setup, this field will allow the definition of quality of service parameters defining requested loss probability and delay parameters. The contents of this field are for future study. The field shall be filled with zeroes until this study is completed. On teardown, this field is reserved. |
| Rsvd | Reserved |
| CTL | Carrier Treatment Length |
| | For setup, this field defines the number of 32-bit words in the Carrier Treatment field that are used. For teardown, this field is reserved. |
| IR/TC | Information Rate/Termination Code |
| | For setup signalling, this field may include an indication of the anticipated average bandwidth requirements for the related path or circuit. If set to zero, this will indicate that the requirements are not explicitly defined and that the provider should perform best effort delivery of any offered traffic. It is intended that the contents of the field will be used to define the required bandwidth (using a logarithmic scale) for constant bit rate (CBR) applications or any other applications requiring guaranteed bandwidth allocation. For teardown signalling, this field may indicate to the receiver the reason why the path or circuit has been removed. Normal terminations (i.e., those requested by the originator of the path or circuit) should be indicated with the value 0. Abnormal terminations (such as a link or switch failure within the network) will use other values. Currently, the value 255 shall be used to indicate any network failure causing an abnormal termination. (Note that this definition does not necessarily require that a service provider explicitly forward an abnormal termination packet in the case of a network failure affecting the associated paths and/or circuits.) |
| X | End-to-end Signalling |
| | The contents of this field are to be transferred end-to-end. The definition of the use of this field is for study. |
| CT | Carrier Treatment |
| | This field is used for defining inter-exchange carrier treatment. The use of this field should follow the specifications for the header extension field defined in TR-TSV-000772. |
| Rsvd | Reserved |
| PVPI | Payload VPI |
| | This field contains the virtual path identifier (VPI) which is to be set up or torn down. Note that a 12 bit field is used allowing for both User Network Interface |

| | TABLE I-continued |
|---|---|
| | Payload Signalling Packet Format |
| | (UNI) and Node Network Interface (NNI) applications (UNI applications may use only the least significant 8 bits). |
| PVCI | Payload VCI<br>This field indicates the virtual circuit identifier (VCI) which is to be set up or torn down. Note that VPIs and VCIs are identified by the requestor. The limmit on the number and/or range of VPIs and VCIs will be by mutual agreement between requestor and provider. |

FIG. 4 is a schematic diagram of an example of a self-threading ATM call. Customer premises equipment 30 initiates a call transmission that is received by a first broadband switching module 12a at an appropriate subscriber interface module 32. Subscriber interface module 32 is one of several interface modules within broadband switching module 12a that can ingress and egress call information according to the required specific traffic configuration service for the call. Further information on ingress and egress processing can be found in copending U.S. patent application Ser. No. 08/339,301, entitled "Apparatus and Method of Processing Asynchronous Transfer Mode Cells" and copending U.S. patent application Ser. No. 08/188,671, entitled "Method and Apparatus for Route Processing Asynchronous Transfer Mode Cells" which are incorporated by reference herein. Broadband switching module 12a also includes a proprietary interface module 34 that controls transmission across a proprietary interface between broadband switching module 12a and another broadband switching module, in this instance a second broadband switching module 12b. All interface modules within broadband switching module 12a exchange traffic via a back plane cell bus 36. Cell bus 36 is a non blocking mechanism that allows any interface module to deliver an ATM cell to all other interface modules within broadband switching module 12a, including itself. Further information on cell bus 36 can be found in copending U.S. patent application Ser. No. 08/015,695, entitled "High Speed Packet Bus" which is incorporated by reference herein.

Each ATM cell on cell bus 36 is prefixed with three bytes of information within two separate fields which are used to define the type of cell and the destination interface module that is to receive the ATM cells within broadband switching module 12a. The cell type field identifies the ATM cell as either a normal traffic cell, a route request cell, or a route response cell. Unless an interface module cannot determine routing information, each ATM cell will be of the normal traffic cell type. For those situations where the interface module cannot determine routing information for the call, the interface module issues a route request cell to a routing processor 38 in order to obtain routing information which is returned in a route response cell. The remaining field in the prepended three byte information is a card slot mask which defines which interface modules receive the ATM cells on cell bus 36. Further information on generating route information can be found in copending U.S. patent application Ser. No. 08/188,310, entitled "Method of Generating Route Information for Asynchronous Transfer Mode Cell Processing" which is incorporated by reference herein.

Subscriber interface module 32 receives call information in a specific traffic configuration service from customer premises equipment 30, adapts the call information into payload ATM cells, determines routing information, and creates a route setup cell in the ATM cell format. The route setup cell includes an available payload VCI to be used for transmitting the payload ATM cells as determined from the routing information, source and destination addresses defined in the call information and used to determine the routing information, the desired bandwidth requirements for transmitting the ATM cells of the call, and the other information as previously discussed above. The route setup cell is prepended with the cell type and card slot mask information and placed on cell bus 36. Proprietary interface module 34 identifies its appropriate bit being set in the card slot mask field and captures the route setup cell. The route setup cell is delivered to proprietary interface PI over a special signalling VCI. Subscriber interface module 32 then creates payload ATM cells from the received call information and delivers the payload ATM cells to cell bus 36 for capture by proprietary interface module 34 and placement on proprietary interface PI. Payload ATM cells are transmitted along proprietary interface PI on the payload VCI as determined by subscriber interface module 32 and placed within the route setup cell and each payload ATM cell. Upon completion of the call, subscriber interface module 32 creates a route teardown cell and places the route teardown cell on cell bus 36 for subsequent capture by proprietary interface module 34 and transmission along proprietary interface PI on the special signalling VCI.

The route setup cell is received at proprietary interface module 40 of second broadband switching module 12b from proprietary interface PI on the special signalling VCI. Ingress proprietary interface module 40 determines routing information, and whether routing information must be requested from route processor 42, that includes a new card slot mask within broadband switching module 12b and new payload VCI information specific for broadband switching module 12b. The route setup cell is updated with this information and delivered to cell bus 44 over a new signalling VCI. An egress subscriber interface module 46 detects a matching card slot mask bit and captures the route setup cell. Egress subscriber interface module 46 extracts and stores routing information from the route setup cell. Since the route setup cell is not part of the calling information, it is discarded and not sent to customer premises equipment 50.

Proprietary interface module 40 receives the payload ATM cells from proprietary interface PI along the payload VCI determined within broadband switching module 12a. Proprietary interface module 40 updates each payload ATM cell with the new payload VCI and card slot mask for broadband switching module 12b as previously determined for the route setup cell. Egress subscriber interface module 46 receives the payload ATM cells placed on cell bus 44 by proprietary interface module 40 according to its appropriate card slot mask bit. Subscriber interface module 46 then translates the payload ATM cells to the appropriate specific traffic configuration service for delivery to customer premises equipment 50. Proprietary interface module 40 then receives the route teardown cell. The route teardown cell is updated with the new signalling VCI and card slot mask and placed on cell bus 44. Proprietary interface module 40 flags the payload VCI as no longer in use. Egress subscriber interface module 46 receives the route teardown cell off cell bus 44, marks the call complete, and discards the route teardown cell.

Figure 5:
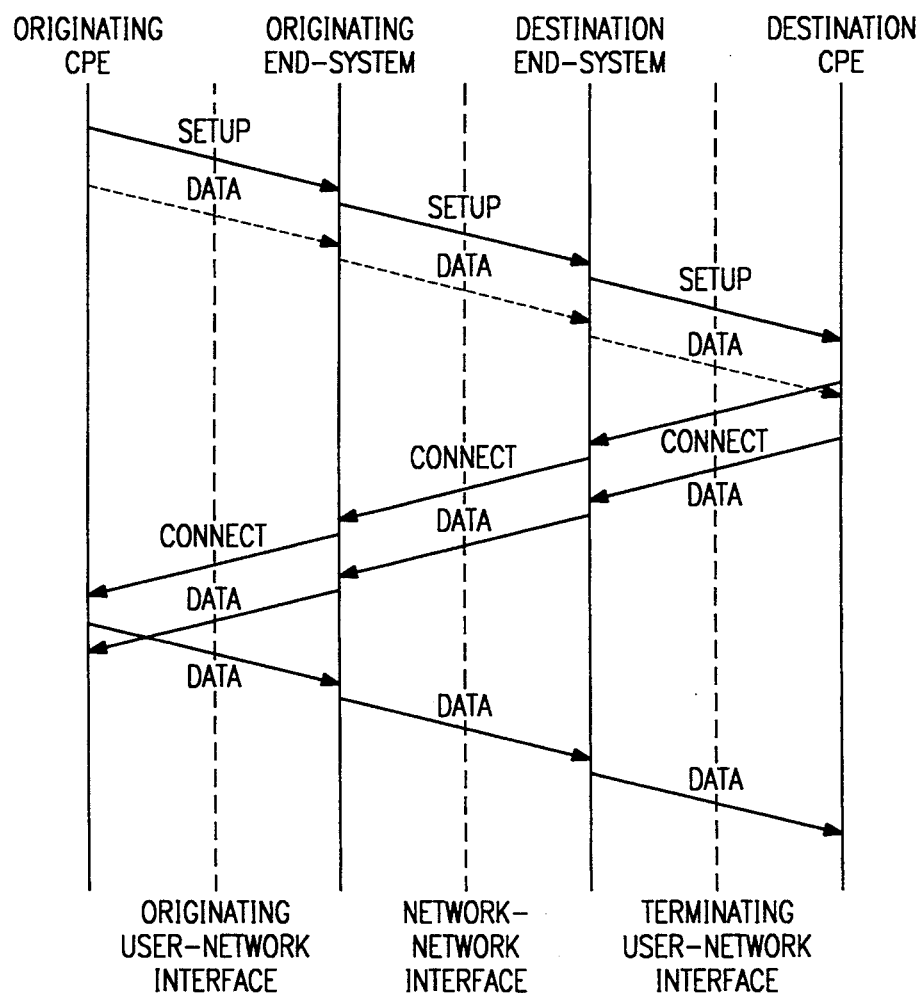
FIG. 5 illustrates a diagram of data flow for a typical call example.

FIG. 5 shows the data flow for a typical calling example. At an Originating Customer Premises Equipment, a payload VCI is assigned and a route setup cell is created that includes the payload VCI, source and destination addresses, destination card and port masks, and a bandwidth request. The route setup cell is transmitted along the special signalling VCI and data flow in the form of payload ATM cells may immediately follow on the payload VCI toward an originating End System.

The Originating End System receives the route setup cell and attempts to allocate the requested bandwidth on the User-Network Interface. If the requested bandwidth exceeds the maximum available bandwidth for the User-Network Interface, then the maximum available bandwidth is allocated by the Originating End System. The Originating End System accepts payload ATM cells on the payload VCI indicate in the route setup cell, performs routing based on the contents of the route setup cell, and updates the route setup cell with a network payload VCI and new route information. The Originating End System attempts to allocate the requested bandwidth on the Network-Network Interface, else the maximum bandwidth is allocated. The updated route setup cell is transmitted along the special signalling VCI and the Originating End System makes an internal logical connection between the User-Network Interface and the selected transit Network-Network Interface path. Payload ATM cells follow the updated route setup cell along the network payload VCI toward a Destination End System.

The Destination End-System receives the updated route setup cell and assigns a VCI for the terminating User-Network Interface path. The Destination End System attempts to allocate the requested bandwidth for the terminating User-Network Interface, else the maximum bandwidth is allocated. The Destination End System accepts payload ATM cells on the network payload VCI indicated within the updated route setup cell. A newly updated route setup cell including the terminating payload VCI is created and sent along the special signalling VCI. The Destination End System then makes the internal connection between the transit Network-Network Interface path and the terminating User-Network Interface. Payload ATM cells proceed along the terminating payload VCI toward a Destination Customer Premises Equipment.

The Destination Customer Premises Equipment receives the newly updated route setup cell and accepts the requested bandwidth or maximum bandwidth available. The Destination Customer Premises Equipment accepts payload ATM cells on the terminating payload VCI indicated within the newly updated route setup cell. The Destination Customer Premises Equipment assigns a return payload VCI and issues a connection request similar to a return route setup cell. Return data flow may immediately follow the return route setup cell on the return payload VCI toward the Destination End System.

The Destination End System receives the return route setup cell and attempts to allocate a return bandwidth request, else a maximum bandwidth is allocated. If necessary, the Destination End System updates the forward bandwidth on the terminating User-Network Interface and on the Network-Network Interface. The Destination End System accepts return payload ATM cells on the return payload VCI indicated within the return route setup cell. A return network payload VCI is assigned and an updated return route setup cell is created and sent on the special signalling VCI. The Destination End System makes the internal connection between the terminating User-Network Interface and the Network-Network Interface. Return payload ATM cells follow along the return network payload VCI toward the Originating End System.

The Originating End System Receives the updatedreturn route setup cell, attempts to allocate the requested return bandwidth, and updates the forward bandwidth on the originating User-Network Interface. The Originating End System accepts return payload ATM cells on the return network payload VCI indicated within the updated return route setup cell. A return originating payload VCI is assigned and a newly updated return route setup cell is created and sent on the special signalling VCI. The Originating End System makes the internal logical connection between the originating User-Network Interface and the Network-Network Interface. The return payload ATM cells follow on the return originating payload VCI toward the Originating Customer Premises Equipment.

The Originating Custom Premises Equipment receives the newly updated return route setup cell and prepares to accept the return data flow. The forward connection path and the return connection path are now established. A route teardown cell is sent through the network upon completion of the call to indicate that appropriate VCI's used in establishing the connection paths are now available for reuse.

Alternative to sending return route setup cells to establish a return connection path, the return connection path can be established while the forward connection path is set up. The forward route setup cell can be used to establish each link of the return connection path as each link of the forward connection path is set up. Delay time is saved by preestablishing the return connection path as well as sending calling information with the route setup cell and prior to establishing a connection path.

In summary, calling information can be transmitted without a prior establishment of the connection path between the source and destination address for the call. A route setup cell is created and distributed to an intermediary destination in order to establish a connection path for the calling information. The calling information is sent immediately after transmission of the route setup cell and prior to any indication that a connection path has been established. The intermediary destination updates the route setup cell and sends the route setup cell to its next destination immediately followed by the calling information in order to establish the next connection path for the calling information. The calling information is immediately transmitted by the intermediary destination to the next destination after transmission of the route setup cell and before any indication has been received that the next connection path has been established. Upon completing transmission of the call information, a route teardown cell is generated and distributed to the intermediary destination in order to indicate that the connection path is now available for reuse.

Thus, it is apparent that there has been provided, in accordance with the present invention, a method of transmitting call information prior to establishing a connection path that satisfies the advantages set forth above. Although the preferred embodiment has been described in detail, it should be understood that various changes, substitutions, and alterations can be made herein without departing from the spirit and scope of the present invention as defined by the following claims.

What is claimed is:

1. A method of transmitting call information prior to establishing a connection path, comprising the steps of:
   creating a route setup cell for specific call information corresponding to traffic of a single call;
   transmitting the route setup cell to an intermediary destination in order to establish a link in a connection path for the specific call information;
   transmitting the specific call information to the intermediary destination along the link of the connection path immediately after said route setup cell transmitting step and prior to receiving an indication from the intermediary destination that the link in the connection path has been established.

2. The method of claim 1, further comprising the steps of:
   creating a route teardown cell for the specific call information; and
   transmitting the route teardown cell to the intermediary destination at a completion of said specific call information transmitting step in order to indicate that resources for the connection path are available for reuse.

3. The method of claim 1, wherein said route setup cell transmitting step is performed on a separate signalling channel from said specific call information transmitting step.

4. The method of claim 1, further comprising the steps of:
   updating the route setup cell at the intermediary destination;
   transmitting the updated route setup cell to a next destination in order to establish a next link of the communication path; and
   transmitting the specific call information to the next destination along the next link of the connection path prior to receiving an indication that the next link of the connection path to the next destination has been established.

5. The method of claim 1, wherein the route setup cell includes a bandwidth request for the link of the connection path indicating an amount of data within the specific call information to be transmitted.

6. The method of claim 5, further comprising the step of:
   allocating a specific bandwidth within the bandwidth request for the link of the connection path.

7. The method of claim 5, further comprising the step of:
   allocating a maximum bandwidth for the link of the connection path in response to a specific bandwidth within the bandwidth request that exceeds the maximum bandwidth for the link of connection path.

8. The method of claim 1, further comprising the step of:
   establishing a return link in a return connection path such that the return connection path may be set up during the establishment of the connection path without requiring connection requests to set up the return connection path after the establishment of the connection path.

9. The method of claim 6, further comprising the steps of:
   creating a return route setup cell for specific return call information corresponding to the specific call information;
   transmitting the return route setup cell through successive return links from a final destination to origination of said single call in order to establish a return connection path; and
   transmitting the return call information along the return connection path prior to establishing each return link and prior to receiving an indication that each return link in the return connection path has been established.

10. The method of claim 9, further comprising the step of:
    updating the specific bandwidth allocated for each link of the connection path during the establishment of each return link of the return connection path.

11. An apparatus for transmitting call information prior to establishing a connection path, comprising:
    circuitry for creating a route setup cell for specific call information corresponding to traffic for a single call, said specific call information being partitioned into a plurality of asynchronous transfer mode cells, said route setup cell created in asynchronous transfer cell format according to destination information within said asynchronous transfer mode cells;
    circuitry for transmitting said route setup cell to an intermediary destination on a first signalling channel in order to establish a link in a connection path for said asynchronous transfer mode cells;
    circuitry for successively transmitting said asynchronous transfer mode cells on a second signalling channel to said intermediary destination along said link of said connection path immediately following transmission of said route setup cell and prior to receiving an indication from said intermediary destination that said link of said connection path has been established;
    circuitry for creating a route teardown cell corresponding to said specific call information; and
    circuitry for transmitting said route teardown cell to said intermediary destination on said first signalling channel immediately after completing transmission of said asynchronous transfer mode cells in order to indicate that resources used to establish said link in said connection path are now available for reuse.

12. The apparatus of claim 11, wherein said route setup cell includes a bandwidth request for said link of said connection path indicating an amount of data within said specific call information to be transmitted.

13. The apparatus of claim 12, further comprising:
    circuitry for allocating a specific bandwidth within said bandwidth request for said link of said connection path.

14. The apparatus of claim 12, further comprising:
    circuitry for allocating a maximum bandwidth for said link of said connection path in response to a specific bandwidth within said bandwidth request that exceeds said maximum bandwidth for said link of said connection path.

15. The apparatus of claim 13, further comprising:
    circuitry for establishing a return link in a return connection path such that said return connection path may be set up during establishment of said connection path without requiring connection requests to set up said return connection path after establishment of said connection path.

16. The apparatus of claim 15, further comprising:

circuitry for creating a return route setup cell for specific return call information corresponding to said single call;

circuitry for transmitting said return route setup cell through successive return links from a final destination to origination of said single call in order to establish a return connection path; and circuitry for transmitting said return call information along said return connection path prior to establishing each return link and prior to receiving an indication that each return link in said return connection path has been established.

17. The apparatus of claim 16, further comprising:

circuitry for updating said specific bandwidth allocated for each link of said connection path during said establishment of each return link of said return connection path.

* * * * *